Dec. 19, 1922.

Re. 15,507.

LE ROY E. JOLLS.

MACHINE TOOL.

FILED AUG. 11, 1922.

6 SHEETS—SHEET 1.

Inventor

Leroy E. Jolls,

By Watson, Cole, Moore & Grindle,

Attorneys.

Dec. 19, 1922.

LE ROY E. JOLLS.
MACHINE TOOL.
FILED AUG. 11, 1922.

Re. 15,507.

6 SHEETS—SHEET 2.

Inventor
Leroy E. Jolls,
By Watson, Cole, Moore & Grindle,
Attorney

Dec. 19, 1922.
Re. 15,507.
LE ROY E. JOLLS.
MACHINE TOOL.
FILED AUG. 11, 1922.
6 SHEETS—SHEET 3.
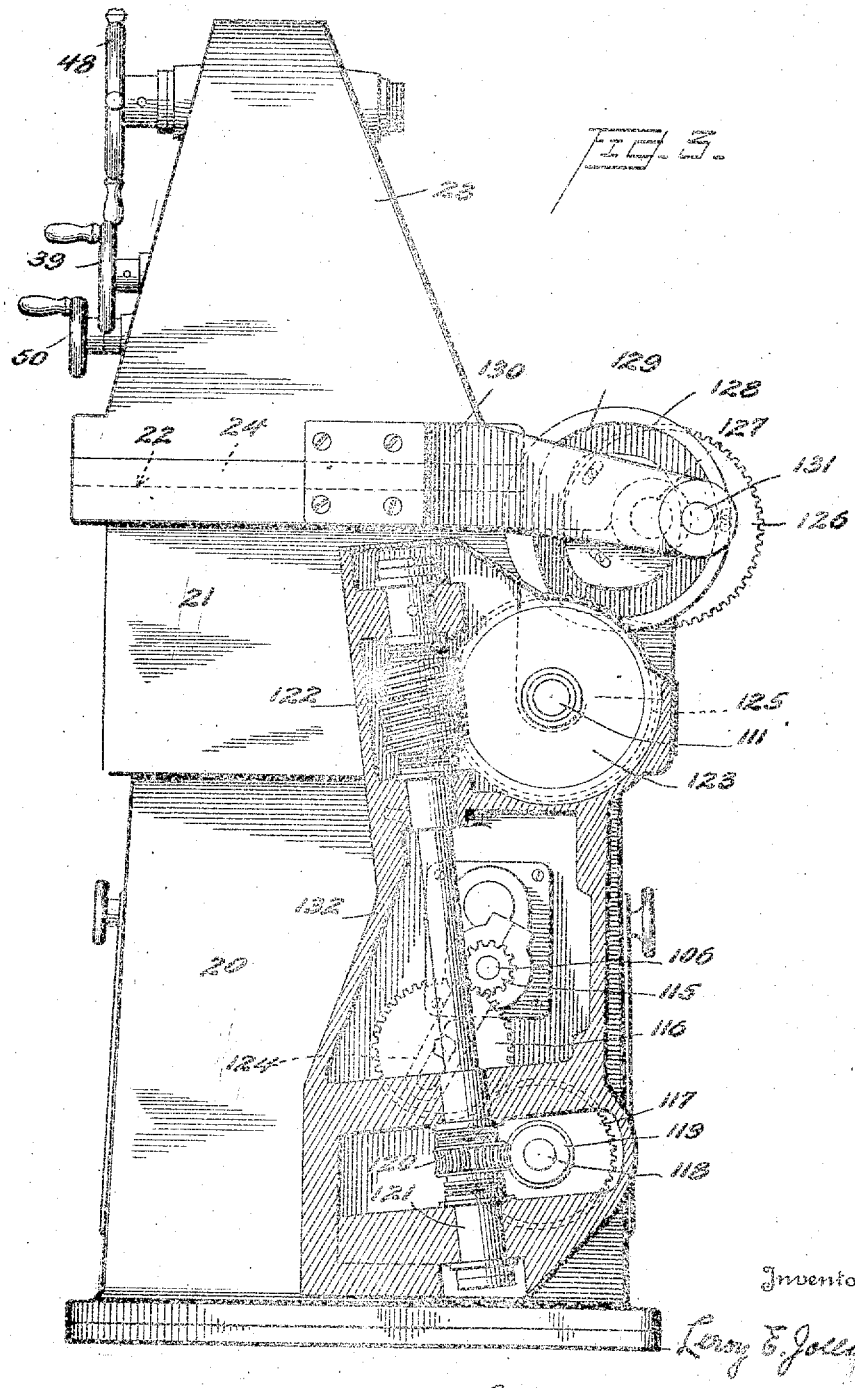
Inventor
Leroy E. Jolls,
By Watson, Cole, Grindle,
Attorneys Dec. 19, 1922. Re. 15,507.
LE ROY E. JOLLS.
MACHINE TOOL.
FILED AUG. 11, 1922.
6 SHEETS—SHEET 4.
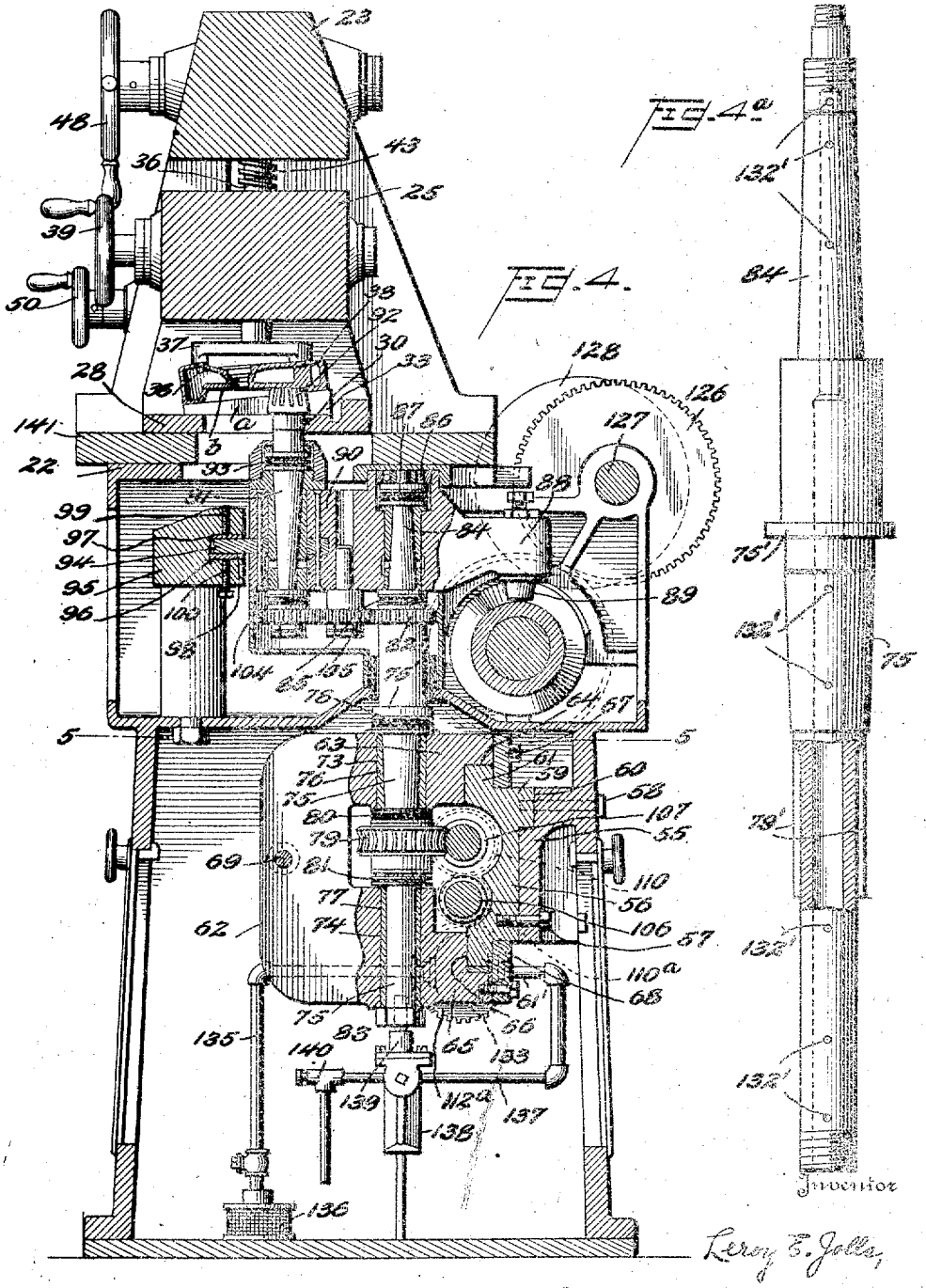
Inventor
Leroy E. Jolls,
By Watson, Cole, Grindle & Watson,
Attorney Dec. 19, 1922.
LE ROY E. JOLLS.
MACHINE TOOL.
FILED AUG. 11, 1922.
Re. 15,507.
6 SHEETS—SHEET 5.
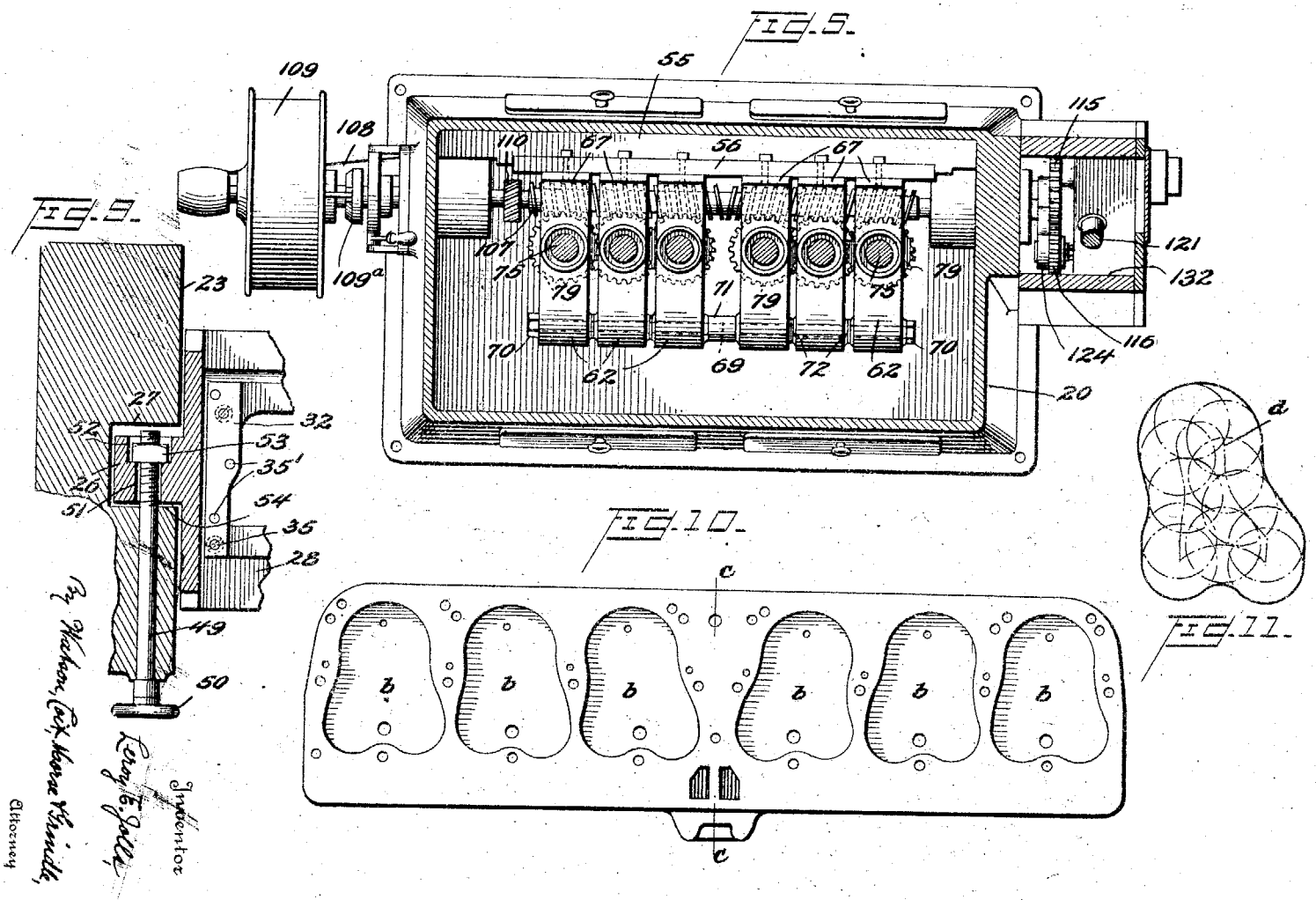
Inventor
Leroy E. Jolls,
By Watson, Cole, Morse & Grindle,
Attorney Dec. 19, 1922.

Re. 15,507

LE ROY E. JOLLS,
MACHINE TOOL.
FILED AUG. 11, 1922.

6 SHEETS—SHEET 6.

Inventor
Leroy E. Jolls,
By Watson, Cole, Morse & Grindle,
Attorney

Reissued Dec. 19, 1922. Re. 15,507

UNITED STATES PATENT OFFICE.

LE ROY E. JOLLS, OF DETROIT, MICHIGAN, ASSIGNOR TO PACKARD MOTOR CAR COMPANY, OF DETROIT, MICHIGAN, A CORPORATION OF MICHIGAN.

MACHINE TOOL.

Original No. 1,397,006, dated November 15, 1921, Serial No. 241,042, filed June 20, 1918. Application for reissue filed August 11, 1922. Serial No. 581,274.

*To all whom it may concern:*

Be it known that I, LE ROY E. JOLLS, a citizen of the United States, residing at Detroit, Wayne County, in the State of Michigan, have invented certain new and useful Improvements in Machine Tools, of which the following is a specification.

The present invention relates to a machine tool and is illustrated and described as embodied in a machine for finishing the surfaces bounding the compression recesses formed in the detachable cylinder heads of hydrocarbon motors. It is to be understood, however, that the invention may be embodied in other machines.

The objects of the invention are to provide an arrangement of tool and work supports and means for actuating the same which permits an exceedingly strong construction without unnecessary weight or bulk; to provide a machine for simultaneously finishing a plurality of compression recesses of a cylinder head; to provide a profiling machine with a plurality of tools and means for operating all of them simultaneously; to provide novel means for simultaneously moving the work and tools in different directions to make the desired cut or cuts on the work; to provide a machine in which the work support and tool are so reciprocated relative to each other as to cause the tool to traverse a closed path on the work; to provide such a machine in which the work support is above the tool; to provide a machine having at least two tools and means on a single shaft for moving them in opposite directions whereby end thrust on the shaft is eliminated; to provide a novel means for supporting and driving the tools; to provide a novel work support and means for adjusting the work to and from the tool; and generally to provide an efficient and dependable machine of the type mentioned. Other objects and features of novelty will be apparent from the description taken in connection with the drawings in which:

Figure 2 is a rear elevation of the machine;

Figure 3 is a sectional elevation taken substantially on the line 3—3 of Figure 1;

Figure 4 is a transverse sectional elevation taken substantially on the line 4—4 of Figure 1;

Figure 1:
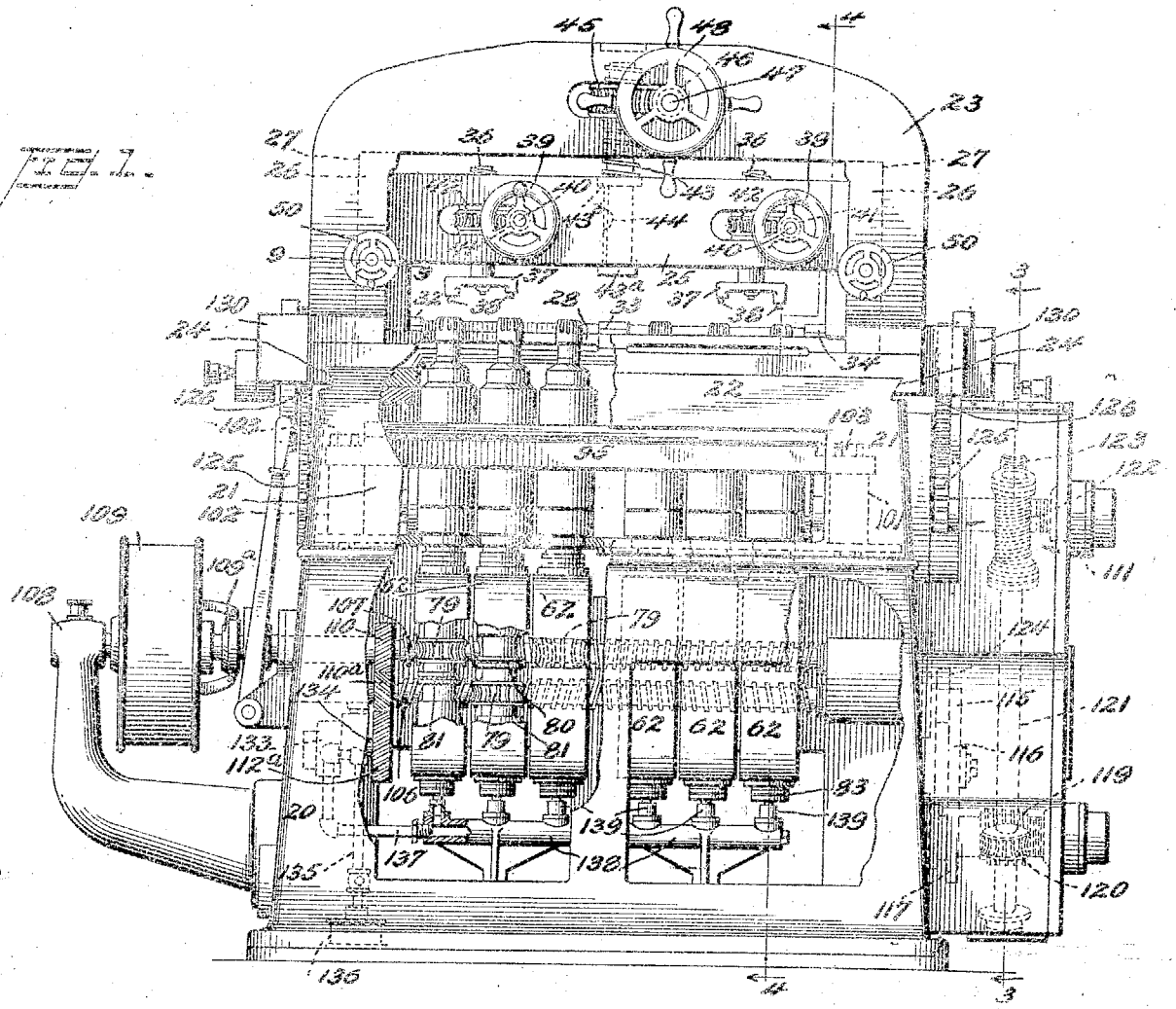
Figure 1 is a front elevation of a machine constructed in acordance with the present invention, certain parts being broken away.
Figure 1:
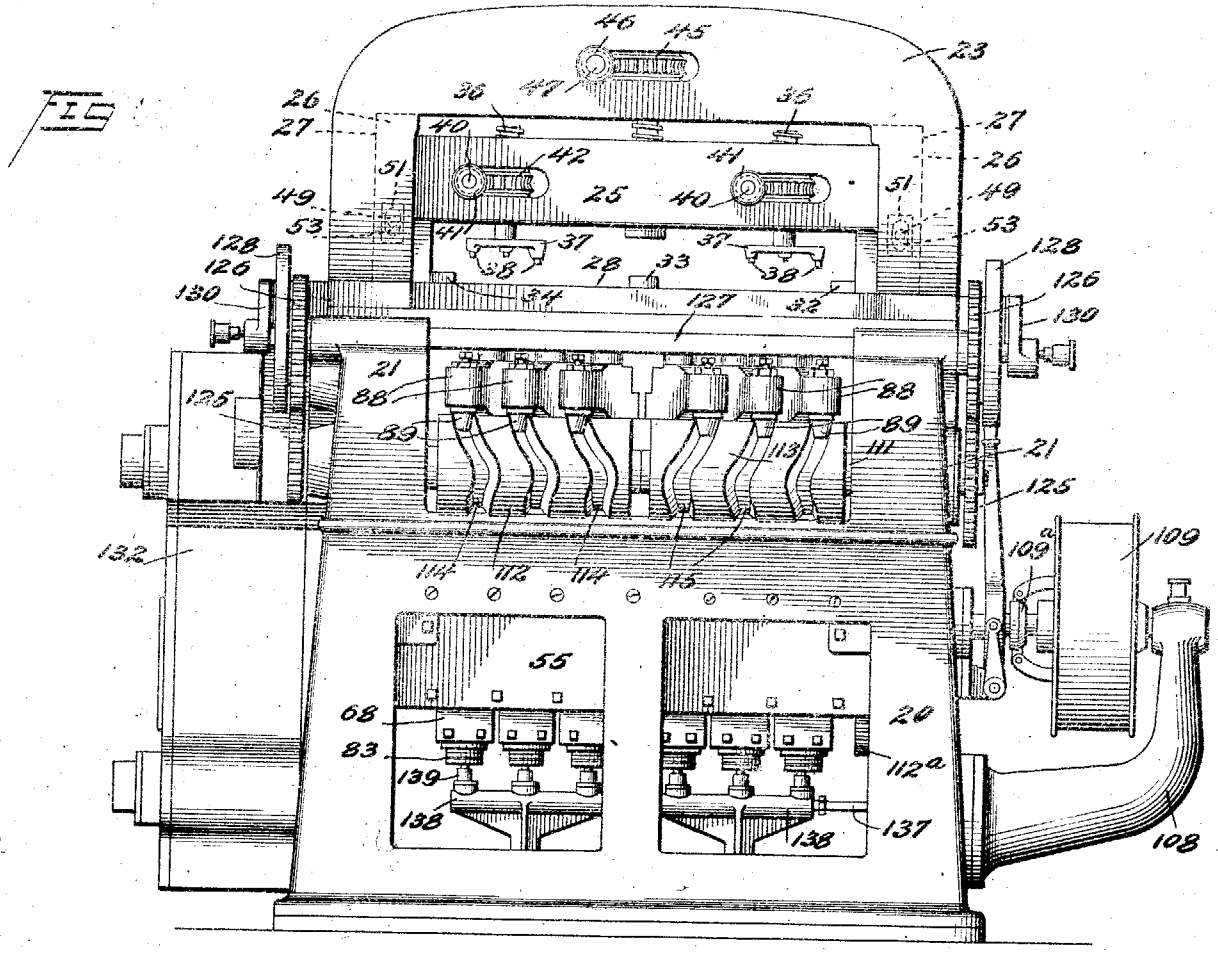
Figure 6:
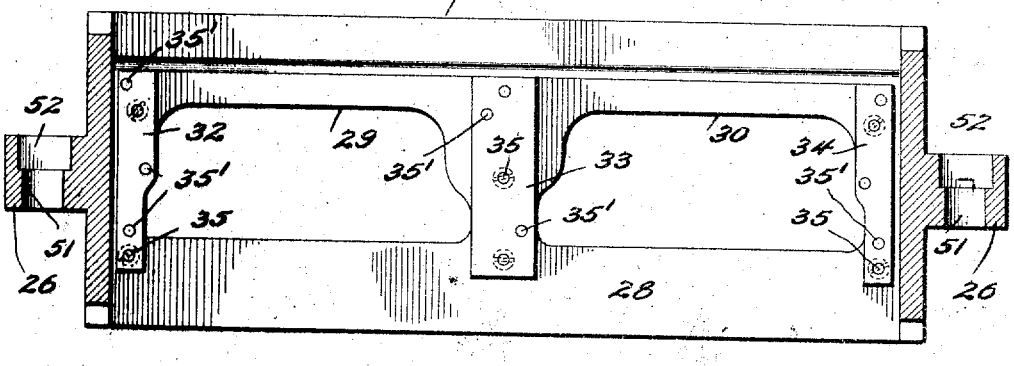
Figure 7:
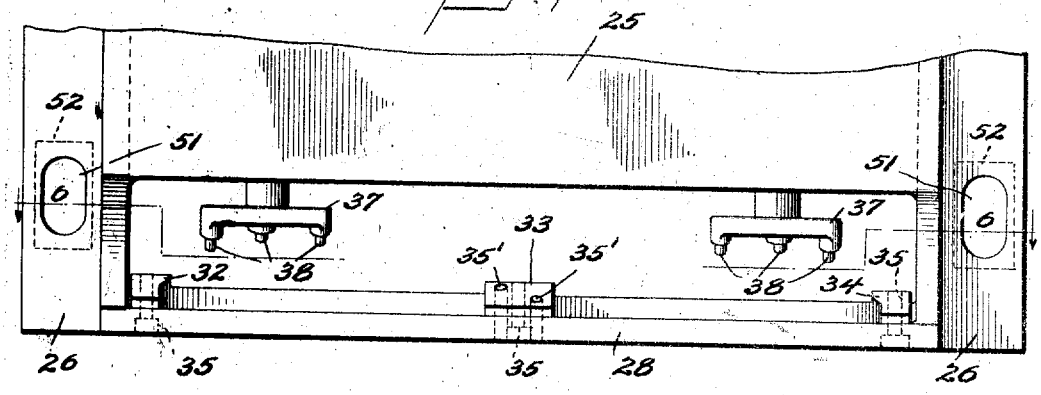
Figure 8:
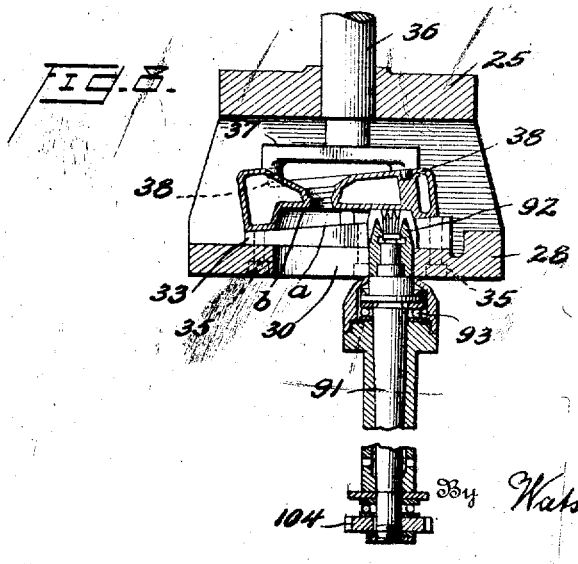

Figure 4[a] is an elevation of one of the spindles;

Figure 5 is a plan sectional view taken substantially on the line 5—5 of Figure 4;

Figure 6 is a sectional view of the inner frame of the work support taken substantially on the line 6—6 of Figure 7;

Figure 7 is a front elevation of the inner frame, the upper portion thereof being broken away;

Figure 8 is an enlarged sectional view showing the relation of the tool and work;

Figure 9 is a sectional view taken substantially on the line 9—9 of Figure 1;

Figure 10 is a bottom plan view of a detachable cylinder head for a hydrocarbon motor, illustrating the form of the compression recesses, the surfaces of which are finished by the present machine; and Figure 11 is a diagrammatic view illustrating the path of the tool relative to the work, showing that all the surfaces bounding a compression recess are finished by the tool.

Referring to the drawings, it will be seen that the machine comprises a hollow base 20 having at the ends of the top thereof the two uprights 21 supporting the table 22. A work holder or support which includes a rectangular frame 23 is mounted on the table 22 for reciprocating movement transversely thereof, the dove-tail ways 24 being provided for this purpose. An inner rectangular frame 25 is mounted within the rectangular frame 23 for adjustment in a vertical direction. For this purpose the inner frame is formed with lateral flanges 26 which are slidable in the ways 27 formed in the outer frame. The lower or bottom member 28 of the inner frame is formed with the two apertures 29 and 30 (Figure 6) and carries three pads 32, 33 and 34 the upper surfaces of which are inclined relative to the bottom member 28, as illustrated at *a* in Figures 4 and 8. The pads are secured to the member 28 in any suitable manner, as by means of screws 35 and dowel pins 35′. As shown in Figures 4 and 8, the bottom surface *b* of the compression recess in the cylinder head is at an angle to the bottom surface of the head proper, and the inclined pads 32, 33 and 34 are provided so that the bottom surface of the compression recesses are positioned in a plane perpendicular to the axis of the tool. It is understood, however, that the invention is not limited to supporting the work in this particular manner, but that said means may be varied so that the work will be arranged in proper position relative to the tool.

For the purpose of clamping the work against the pads the upper member of the inner frame 25 is provided with a pair of spaced threaded rods 36 which at their lower ends have the heads 37 carrying the pins 38 adapted to engage in registering recesses in the work. The rods 36 are adjusted vertically by means of the hand wheels 39 projecting at the front of the machine and mounted on the shafts 40 which carry the worms 41 (Figure 2) meshing with the worm wheels 42, which are threaded on the rods 36. It will be seen, as rotation of the rods 36 is prevented by engagement with the work, when the hand wheels 39 are turned the worm wheels 42 will be rotated and act as nuts to raise or lower the rods 36.

It is desirable to adjust the position of the work vertically relative to the tools and for this purpose the inner frame 25 is mounted for sliding movement in a vertical direction as previously described, and any suitable mechanism may be provided for adjusting the inner frame. As shown, a short shaft 43 extends through the upper member of the frame 25 and is secured therein against rotation as by the key 44, longitudinal movement being prevented by the collars 43[a] and 43[b]. The upper portion of this shaft is threaded and engages in the worm wheel 45, the latter being rotated by a worm 46 (Figure 2) on the shaft 47 having the hand wheel 48 at the front side of the machine. In order to prevent any play or looseness of the flanges 26 in the ways 27, each of the side members of the outer frame has a horizontal shaft 49 (Figure 9) which at the front of the machine carries a hand wheel 50. Each shaft is threaded at its inner end and extends through the elongated aperture 51 in the flange 26 of the inner frame (see Figures 6 and 7). An elongated recess 52 is formed in the rear of the flange 26 and a nut 53 threaded on the end of the shaft 49 is fitted in the same, so that it is held against rotation but may slide therein. It will be seen, therefore, when a hand wheel 50 is rotated in a direction to screw the shaft 49 into the nut 53, the flange 26 will be held in contact with the wall 54 of the way 27. In this manner as the pins 38 position the work relative to the inner frame and the means just described positively secures the inner frame always in the same position transversely of the machine, the work will always be located accurately in the same position relative to the tools.

Referring to Figure 10, it will be seen that the three compression recesses at the right of the transverse center line *c—c* are symmetrically located with respect to the other recesses on the other side of said center line. For the purpose of finishing the entire surface bounding these recesses, in the present embodiment of the invention, the work is reciprocated transversely of the machine and simultaneously the tools, one being provided for each recess, are moved in a path at an angle to the direction of movement of the work. The resulting path of the axis of a tool relative to the work is illustrated by the dotted line *d* in Figure 11. Some of the positions of the tool are illustrated in dotted lines and it is apparent that the entire bottom surface *b* of the recess is finished by the top of the tool and the side or edge surfaces are finished by the cutting edges at the sides of the tool. In this manner the entire bounding surface of the recess is finished.

The means for moving the tools in their respective paths and for rotating the same are located beneath the table 22 and within the hollow base 20. The rear wall of the base 20 is formed with a supporting member 55 extending longitudinally of the machine. A bar 56 is secured to and supported by the member 55, by means of the bolts 57 and 58 and the projection 59 formed on the bar and seated in the recess 60 in the member 55. At its top and bottom, the bar 56 is formed with the flanges 61 and 61′. A series of U-shaped members 62, one for each tool, are arranged as shown in the drawings. Each of these members 62 has one of its arms 63 formed with a seat 64 for the flange 61 and the other arm 65 formed with a seat 66 for the flange 61′, whereby the U-shaped members are supported and carried by the bar 56. In order to securely hold the members 62 to the bar 56, each member has the plates 67 and 68 secured to the arms 63 and 65 respectively to clamp the flanges 61 and 61′ between said plates and the seats formed in the arms. In order to hold the members 62 at their bases in proper spaced relation, a rod 69 extends through the same and has the nuts 70 threaded on the ends. As clearly shown in Figure 5, the members 62 are arranged in two groups of three each. One group is spaced from the other by means of the spacing sleeve 71 arranged around the rod 69, and the members 62 of each group are maintained in proper spaced relation by means of the abutting bosses 72.

The arms 63 and 65 of each of the U-shaped members 62 is formed with the alined bores 73 and 74, and a spindles 75 is mounted in each of said bores, these spindles being surrounded by the bushings 76 and 77 in the bores. Each of the spindles 75 extends from the bottom of the bottom arm 65 to the table 22. At a point just above the arm 63 each spindle is formed with a shoulder 75′ and a roller thrust bearing 78 is interposed between this shoulder and the top of the arm 63, so that any downward pressure on this sleeve is carried through the bearing 78 to the U-shaped member 62. A worm wheel 79 is secured to each of the spindles 75 for rotation therewith by splines 79′ and is positioned between the arms 63 and 65 of the U-shaped member any end thrust being carried through the roller thrust bearings 80 and 81 to the arms.

Near its upper end each of the spindles 75 has a gear 82 secured for rotation therewith. The lower end of each of the spindles 75 has a nut 83 threaded on the same, which bears against the lower side of the arm 65, and the top of each spindle is tapered, as shown at 84 in Figure 4. A tool support in the form of a lever is pivoted on this tapered portion 84 of each spindle and a thrust bearing 85 is interposed between the bottom of the lever and the spindle, so that the weight of the lever is transmitted through the bearing on to the said spindle. The upper tapered end 84 is provided with a radial roller bearing 86, and a thrust bearing 87. Each lever comprises two arms, one of which 88 extends to the right from the shaft as viewed in Figure 4., and this arm carries a roller 89 for a purpose presently to be described. The other arm 90 of each tool support rotatively carries a tool holder 91 and a tool 92 is adapted to be secured to the holder, a thrust bearing 93 being provided to carry any axial thrust of the tool to the arm. A projecting bearing plate 94 is secured to each arm 90 and is slidingly supported by the block 95. For this purpose the block is formed with a recess 96 and wear plates 97 and 98 are interposed between the sides of the plate 94 and the walls of the recess, these plates being adjustable, as by means of the set screws 99 and 100. As shown in Figure 1 the bar 95 is supported at its ends on the sleeves 101 and 102, bolts 103 passing through the bar and sleeves and securing the same to the top of the base. The lower end of each tool holder 91 has a gear 104 secured thereto for rotation therewith, and this gear is in mesh with an idler gear 105, which in turn meshes with the gear 82 on the spindle 75. It will be seen, therefore, when the worm wheel 79 is rotated, the tool holder and tool will also be rotated through the connections described.

Referring now to Figure 1, it will be seen that two shafts 106 and 107 extend longitudinally of the base of the machine, the shaft 107 being arranged vertically over the shaft 106 and having two threaded portions, the lead of the thread on one portion being opposite to that of the other. Likewise the shaft 106 has two threaded portions, the lead of one portion being opposite to that of the other. The shaft 107 is extended outside of the base at the left of the machine and has its outer end mounted in a bearing in the bracket 108. A pulley 109 is rotatively mounted on the shaft and a clutch 109ª is provided for rotatively connecting the pulley and shaft 107. The shaft 106 is driven from the shaft 107 by means of the meshing gears 110 and 110ª, and gear 110ª in turn meshes with another gear 112ª which drives the oil pump for the oiling system. Referring to the three worm wheels of the left hand group of tools shown in Figure 1, it will be observed that the end worm wheels 79 are driven from the shaft 107, while the middle worm wheel 79 is driven from the shaft 106. However, as the lead of the threaded portion of shaft 106 just below that of shaft 107 is opposite to the latter, these three worm wheels will all be rotated in the same direction, and consequently the three tools of the left hand group will all rotate in the same direction. The worm wheels of the right hand group of tools are arranged in the same manner as the left hand, but as the threaded portions of the shaft 107 and 106 have a lead opposite to that of the portions already described, the worm wheels and consequently the tools of this right hand group will be driven in the opposite direction. By displacing the middle worm wheel of each group downward with respect to the other two, the three tools are permitted to be arranged closer together than they would be if the worm wheels were all driven from a single shaft. Furthermore it will be observed, as the two worm wheels driven by the shaft 106, are driven by threaded portions having opposite leads, there will be no end thrust on the shaft. For a similar reason there will be no end thrust on the shaft 107.

Directly under the arms 88 of the tool supporting levers is a shaft 111, which carries two cams 112 and 113, each formed with the cam grooves 114 and 115, these grooves being oppositely inclined, as shown in Figure 2. Each of the rollers 89 carried on the arms 88, is adapted to engage in one of the grooves of the cams. In this manner the lever carrying the tool support is oscillated to and fro and consequently the tool support and the tool are moved to and fro in a curved path, this path being substantially at right angles relative to the direction of movement of the work support. For the purpose of rotating the shaft 111, the end of the shaft 106 (see Figure 3) carries a pinion 115 which through the idler gear 116 drives a gear 117 on a shaft 118. This latter shaft has a worm 119 which meshes with the worm wheel 120 connected to rotate with the substantially vertical shaft 121. The upper end of this latter shaft has a worm 122 in mesh with a worm wheel 123 on the shaft 111. If it is desired to change the angular velocity ratio between the shafts 106 and 111, the pinion 115 may be changed, the idler 116 being mounted on a slotted pivoted arm 124 in the usual manner for this purpose. It will be observed that as the cam grooves of the cam 112 are oppositely inclined with respect to those on cam 113, the axial thrust of one cam will counterbalance that of the other, so that the shaft 111 has no longitudinal thrust in its bearings. It will also be observed that in the form of cylinder head shown in Figure 10, the recesses on one side of the center line C—C are not arranged in exactly the same way in the head, that is, the major axes of these recesses are not parallel. The result is that when the machine is designed to operate upon this particular form of head, the cam grooves 114 differ slightly from each other and the same is true of the cam grooves 115.

The work support is adapted to be reciprocated in timed relation with the movement of the tool. As shown the shaft 111 has a gear 125 on each end thereof driving a gear 126 on each end of a shaft 127 arranged parallel to the shaft 111. Outside the gears 126, on each end of the shaft 127 is a cam 128 which is formed with a cam groove 129. An arm 130 is secured to each side of the work support near the bottom thereof and carries a roller 131 which works in the cam groove 129. Thus as the tools are reciprocated to and fro, the work support will be moved back and forth by means of the cams 128. By properly designing the cams 112, 113 and 128 the path of the tool relative to the work may be as desired. The drive for connecting shafts 106 and 111 may be arranged within the casing 132, so that the gears will not be a menace to the operator.

For the purpose of properly lubricating the bearings for the spindles 75, each is made hollow nearly to its upper end, and the bearing portions have the radial oil holes 132′ whereby oil is fed to said bearings. An oil pump 133 (Figures 1 and 4) is connected to be driven by the shaft 134 carrying gear 112ᵃ, and its suction pipe 135 takes the oil from the bottom of the base 20 through the strainer 136. The discharge pipe 137 of the pump has a connection to one end of a manifold 138 which has six nipples 139, one for each spindle. The discharge pipe also has a relief valve 140. Thus oil is continually forced through the holes 132′ of the spindles and drains back to the bottom of the base. If the pressure of the oil is excessive, then relief valve 140 will open permitting the oil to discharge directly into the base of the machine. Obviously other bearings of the machine might be lubricated by oil from the pump if desired.

In the operation of the machine the hand wheels 50 are manipulated so that the flanges 26 of the inner frame 25 (see Figure 9) are held against the surface 54 of the guideways 27, so that the frame may be adjusted up and down but without any looseness or play. The hand wheel 48 is then rotated to raise the frame 25. The work which in this instance is a cylinder head casting is clamped against the pads 32, 33, and 34 by turning wheels 39 and the frame moved downward to feed the work against the tools by operating hand wheels 48. It is to be understood, although the tools might cut out the entire recesses, in the embodiment of the invention illustrated, the tools merely finish the surfaces bounding the recesses, the recesses having been cast in the head. The work is then fed downward against the tools until the bottom member 28 of the inner frame 25 abuts the bottom member 141 of the frame 23, thus accurately determining the position of the bottom of the recesses with respect to the tools. The work support 23 is caused to reciprocate by means of the cams 128 and the tools are rocked about the axes of their associated spindles 75 by means of cams 112 and 113, so that each of the tools moves in a path substantially at right angles to the direction of reciprocation of the work support. The cams 128, 112 and 113 are designed so that the path of the tools with respect to the work is such that the tools will give the proper outline to the recesses and will also finish the entire bottom surface thereof. As previously described the bearings for the spindles 75 are lubricated by oil forced to the said bearings by the pump 133.

Although a specific embodiment of the invention has been described in detail, it is to be understood that the invention is not limited to the exact construction illustrated but that changes and modifications may be made which come within the scope of the appended claims.

Having thus described my invention what I claim as new and desire to secure by Letters Patent is:

1. A machine for simultaneously finishing a plurality of compression recesses in a cylinder head including in combination, a support for the cylinder head, a plurality of tool holders rotatably mounted and spaced a distance corresponding to the recesses in the cylinder head, means for rotating said holders, rotatable means for moving said support to and fro in one direction, other rotatable means for moving each of said holders to and fro in a direction transverse to the first named direction, whereby the axis of each of said holders traces a closed path within one of the recesses of the cylinder head.

2. A machine for simultaneously finishing a plurality of compression recesses in a cylinder head including in combination, a support for the cylinder head, a plurality of tool holders rotatably mounted and spaced a distance corresponding to the recesses in the cylinder head, a device for moving said support and holders relative to each other in a direction parallel to the axis of said tool holders whereby the tools in said holders are brought into operative relation with the cylinder head, means for rotating said tool holders, and means for moving said support and tool holders relative to each other in a direction at right angles to the axes of said holders, whereby the axis of each tool holder is caused to trace a closed path within one of the recesses of the cylinder head.

3. A machine for simultaneously finishing a plurality of compression recesses in a cylinder head including in combination, a support for the cylinder head, a plurality of tool holders rotatably mounted and spaced a distance corresponding to the recesses in the cylinder head, a device for moving said support and holders relative to each other in a direction parallel to the axis of said tool holders whereby the tools in said holders are brought into operative relation with the cylinder head, means for rotating said tool holders, rotatable means for moving said support to and fro in a direction substantially perpendicular to the axes of said holders, and other rotatable means for moving each of said holders to and fro in a direction transverse to the last named direction of movement of said support, whereby the axis of each of said holders traces a closed path within one of the recesses of the cylinder head.

4. A machine for simultaneously finishing a plurality of compression recesses in a cylinder head including in combination, a work holder for supporting a cylinder head, a plurality of tool holders spaced a distance corresponding to the recesses in the cylinder head, means for rotating said tool holders, means for moving said work holder to and fro in a direction perpendicular to the axes of said tool holders, rotatable means separate from said last mentioned means for moving each of said tool holders to and fro in a direction substantially perpendicular to the direction of movement of said work holder, and a driving member from which each of said means is operated.

5. A machine for simultaneously finishing a plurality of compression recesses in a cylinder head including in combination, a work holder for supporting a cylinder head, a plurality of tool holders spaced a distance corresponding to the recesses in the cylinder head, a device for moving the work holder and tool holders relative to each other to bring the tools in contact with the work, means for rotating said tool holders, rotatable means for moving said work holder to and fro in a direction perpendicular to the axes of said tool holders, other rotatable means for moving each of said tool holders to and fro in a direction substantially perpendicular to the direction of movement of said work holder, and a driving member from which each of said means is operated.

6. A machine for simultaneously finishing a plurality of compression recesses in a cylinder head, including in combination, a work holder for the cylinder head, a plurality of tool holders rotatably mounted and spaced a distance corresponding to the compression recesses of the cylinder head, gear mechanism for rotating each of said tool holders, a driving member for operating said gear mechanism, means operated from said driving member for moving said work holder to and fro in one direction, and means separate from said last mentioned means and also operated from said driving member for moving each of said tool holders to and fro in a direction transverse of the last named direction.

7. A machine for simultaneously finishing a plurality of compression recesses in a cylinder head including in combination, a work holder for the cylinder head, a plurality of tool holders rotatably mounted and spaced a distance corresponding to the compression recesses of the cylinder head, gear mechanism for rotating each of said tool holders, a driving member for operating said gear mechanism, means operated from said driving member for moving said work holder to and fro in one direction, and rotatable cam means also operated from said driving member for moving each of said tool holders to and fro in a direction transverse of the last named direction.

8. A machine for simultaneously finishing a plurality of compression recesses in a cylinder head, including in combination, a work holder for the cylinder head, a plurality of tool holders rotatably mounted and spaced a distance corresponding to the compression recesses of the cylinder head, gear mechanism for rotating each of said tool holders, a driving member for operating said gear mechanism, rotatable cam means operated from said driving member for moving said work holder to and fro in one direction, and rotatable cam means also operated from said driving member for moving each of said tool holders to and fro in a direction transverse of the last named direction.

9. A machine for simultaneously finishing a plurality of compression recesses in a cylinder head, including in combination, a support for the cylinder head, a plurality of tool holders rotatably mounted and spaced a distance corresponding to the recesses of the cylinder head, manually operated means for moving said support and holders relative to each other to bring the tools in said holders in the recesses of the cylinder head, means for rotating said holders, rotating means for moving said support to and fro in a direction substantially perpendicular to the axes of said holders, and other rotatable means for moving each of said holders to and fro in a direction transverse to the last named direction of movement of said support, whereby the axis of each of said holders traces a closed path within one of the recesses of the cylinder head.

10. A metal working machine including in combination, a work support, a plurality of tool holders, a gear wheel arranged concentric with and secured to each of said tool holders, a driving member, means operated from said member for simultaneously rotating said gear wheels and tool holders, rotatable means operated from said driving member for moving said support to and fro in a direction perpendicular to the axes of said tool holders, and other rotatable means also operated from said driving member for moving each of said tool holders to and fro in a direction tranverse of said first named direction, whereby the axis of each of said tool holders traces a closed path on said work support.

11. A metal working machine including in combination, a shaft, means for rotating the same, a slidable work support, mean rotatable by said shaft for sliding said support to and fro in one direction, a plurality of tool holders arranged in line and spaced apart, each of said holders being rotatable about an axis perpendicular to the direction of movement of said support, other means rotatable from said shaft for moving each of said holders to and fro in a direction transverse of the direction of movement of said support, a shaft, means for rotating the same, and gear mechanism operated by rotation of said shaft for rotating each of said tool holders.

12. A metal working machine including in combination, a slidable work support, a shaft, cam means operated by said shaft for sliding said support to and fro in one direction, a plurality of tool holders arranged in line and spaced apart, each of said tool holders being rotatable about an axis perpendicular to the direction of movement of said support, a second shaft and cam means operated thereby for moving each of said tool holders to and fro in a direction transverse of the direction of movement of said support, a third shaft and means operated thereby for rotating each of said tool holders, and means for simultaneously rotating said shafts.

13. A metal working machine including in combination, a driving member, a work holder, a tool holder, means for moving one of said holders toward the other to bring the tool into contact with the work, rotatable means operated from said member for moving said work holder to and fro in one direction, other rotatable means for simultaneously moving said tool holder to and fro in a direction transverse of the direction of movement of said work holder, whereby the axis of the tool holder traces a closed path on the work holder, and means for rotating said tool holder.

14. A metal working machine including in combination, a slidable work support, a plurality of tool holders, a shaft and separate rotatable means operated from said shaft for simultaneously rotating said tool holders, sliding said support to and fro in one direction and moving each of said holders to and fro in a direction transverse to the direction of movement of said support.

15. A metal working machine including in combination, a slidable work support, a plurality of tool holders, a shaft, separate rotatable means operated from said shaft for simultaneously rotating said tool holders, sliding said support to and fro in one direction and moving each of said holders to and fro in a direction transverse to the direction of movement of said support, and manually operated means for moving the work support and tool holders relative to each other to bring the tools in contact with the work.

16. A metal working machine including in combination, a slidable work holder, a rotatable tool holder, means for moving one of said holders toward and from the other in a direction parallel to the axis of said tool holder, a driving member, and separate rotatable means operated from said member for rotating said tool holder, sliding said work holder to and fro in one direction and moving the tool holder to and fro in another direction.

17. A metal working machine including in combination, a work holder, a tool holder, manually operated means for moving one of said holders toward and from the other, means for rotating the tool holder, and rotatable cam means for moving the work holder to and fro in one direction and the tool holder simultaneously to and fro in a direction substantially parallel to the plane of movement of the work holder and substantially at right angles to the first mentioned direction, whereby the axis of the tool holder traces a closed figure on the work holder.

18. A metal working machine including in combination, a slidable work support, a tool holder, a driving member, gear mechanism operated from said driving member for rotating said tool holder, rotatable means operated from said driving member for sliding said support to and fro in one direction, and other rotatable means operated from said driving member for moving said holder to and fro in another direction.

19. A metal working machine including in combination, a work support, a tool holder, mechanism for rotating said holder, a rotatable cam for moving the holder to and fro in one direction, a cam rotatable about an axis different from the axis of said first named cam for moving the work support to and fro in another direction, and a driving member for operating said mechanism and said cams.

20. A metal working machine including in combination, a work support, a rotatable cam for moving said support to and fro in one direction, a pivotally mounted tool support, a tool holder carried by said support for rotation about an axis eccentric and parallel to the pivot axis of the tool support, a rotatable cam for rocking said tool support to cause said tool holder to move to and fro in a direction transverse of the direction of movement of the work support, a driving member, and means operated by said member for rotating said cams and said tool holder.

21. A metal working machine including in combination, a work support, a rotatable cam for moving said support to and fro in one direction, a pivotally mounted tool support, a tool holder carried by said support for rotation about an axis eccentric and parallel to the pivot axis of the tool support, a rotatable cam for rocking said tool support to cause said tool holder to move to and fro in a direction transverse of the direction of movement of the work support, a gear coaxial with said tool holder for rotating the same, a driving member, and means operated from said driving member for rotating said gear and said cams.

22. A profiling machine including in combination, a work support, a tool holder, one of said parts being mounted for rectilinear reciprocatory movement, and the other for reciprocatory movement in a curved path across the other part, and means for reciprocating said parts.

23. A metal working machine including in combination, a work support, a tool support pivoted for rocking movement about an axis intermediate its ends, a rotatable tool holder at one end of the tool support, a cam operative on the other end to rock the tool support and means for continuously rotating the holder.

24. A metal working machine including in combination, a work holder, a plurality of independent tool supports arranged side by side and each pivoted for rocking movement about an axis intermediate its ends, a rotatable tool holder mounted on one end of each of said supports, a shaft arranged adjacent the ends of said supports opposite the tool holders, a plurality of cams on said shaft for rocking said supports, and means for rotating said tool holders.

25. A metal working machine including in combination, a work support, two rotatable tool holders and means for rotating said holders including a worm wheel operatively connected to each holder, and a driving shaft, a portion of which has a right hand thread associated with one worm wheel and another portion a left hand thread associated with the other worm wheel whereby the said shaft is subjected to no end thrust.

26. A machine tool including in combination, a work support, two tool holders, means for reciprocating said support, and means for moving the tool holders in a path transverse to the path of the support, the direction of movement of one holder being always opposite to the direction of movement of the other.

27. A machine tool including in combination, a work support, two tool holders, each mounted for movement in a curved path, means for reciprocating said support, and means for moving said holders in their curved paths, the direction of movement of one holder being always opposite to the direction of movement of the other.

28. A machine tool including in combination, a work support, two tool holders, means for reciprocating said support, and means for moving the tool holders in a path transverse to the path of the support including a rotatable shaft having cams for actuating said holders constructed to move said holders in opposite directions.

29. A metal working machine including in combination, a work support, a plurality of parallel spindles, a tool support mounted on each spindle for rocking movement, a tool holder carried by each support for rotation about an axis eccentric to the associated spindle axis, means for rocking the tool support, means for rotating the spindles and gearing connecting each spindle and its associated tool holder.

30. A metal working machine including in combination, a work holder, a plurality of independent tool supports arranged side by side and each pivoted for rocking movement about an axis intermediate its ends, a rotatable tool holder mounted on one end of each of said supports, a shaft arranged adjacent the ends of said supports opposite the tool holders, a plurality of cams on said shaft for rocking said supports, one group of said cams being arranged to rock a part of said supports in one direction and another group being arranged to simultaneously rock the rest of said supports in the opposite direction, and means for rotating said tool holders.

31. A machine of the class described including in combination, a tool holder, a slidable work support comprising an outer rectangular frame and an inner rectangular frame slidably mounted within the outer frame having means to clamp the work and means for moving the inner frame relative to the outer to adjust the work relative to the tool holder.

32. A machine of the class described including in combination, a tool holder, a slidable work support comprising an outer rectangular frame and an inner rectangular frame slidably mounted within the outer frame having means to clamp the work against one side thereof, said side and the adjacent side of the outer frame having registering openings for the tool, and means for moving the inner frame relative to the outer frame to adjust the position of the work relative to the tool holder.

33. A machine of the class described including in combination a tool holder, a horizontally slidable work support comprising a vertical rectangular outer frame, and a rectangular inner frame vertically slidable in the outer frame having means to clamp the work against the bottom side thereof, said side and the corresponding side of the outer frame formed with openings for the tool holder and means for sliding the inner frame to adjust the position of the work relative to the tool.

34. A machine of the class described including in combination, a work holder, a tool support, means for moving one of said parts towards and from the other to bring the tool in contact with the work, said work support having portions provided with surfaces inclined relative to the axis of said tool support, and means for clamping the work against said inclined surfaces.

35. A metal working machine including in combination, a work support, a tool holder, and means to move said parts transversely to each other whereby the axis of the holder traces a closed figure on the support, said support being mounted for adjustment to and from the holder.

36. A metal working machine including in combination, a horizontally reciprocable work support, a tool holder below said support, means to reciprocate the holder across the support in a path parallel thereto and means to rotate the holder.

37. A machine for finishing compression recesses in cylinder heads including in combination, a work support on which a cylinder head is adapted to be secured with the compression recesses thereof facing downwardly, means for moving the said support to and fro in a horizontal direction, a tool holder below said support with its axis arranged perpendicular to the direction of movement of said support, means for moving said tool holder to and fro in a direction transverse of the direction of movement of the support, means for moving said support toward and from said holder whereby the tool carried by said holder is positioned in one of the recesses of the cylinder head, and means for rotating said holder.

38. A machine for finishing compression recesses in cylinder heads including in combination, a work support having surfaces inclined to the horizontal, means for clamping a cylinder head against said inclined surfaces with the compression recesses thereof facing downwardly, means for moving said support to and fro in a horizontal direction, a tool holder below said support with its axis arranged vertically, means for moving said holder to and fro in a direction transverse to the direction of movement of said support, and means for moving said support toward said holder whereby the tool carried thereby is positioned within one of the compression recesses of the head, and means for rotating the holder.

39. A machine for simultaneously finishing a plurality of compression recesses in a cylinder head including in combination, a work-holder for supporting a cylinder head a plurality of tool holders spaced a distance corresponding to the recesses in the cylinder head, means for rotating said tool holders, a drive shaft, rotatable means operated continously during rotation of said shaft for moving said work-holder to and fro in a direction perpendicular to the axes of said holders, other rotatable means operated continuously during rotation of said shaft for moving each of said tool holders to and fro in a direction substantially perpendicular to the direction of movement of said work-holder.

40. A machine for simultaneously finishing a plurality of compression recesses in a cylinder head including in combination, a work-holder for supporting a cylinder head, a plurality of tool holders spaced a distance corresponding to the recesses in the cylinder head, means for rotating said tool holders, a drive shaft, a rotatable cam operated continuously from said drive shaft for moving said work-holder to and fro in a direction perpendicular to the axes of said tool holder, another rotatable cam continuously operated from said drive shaft for moving each of said tool holders to and fro in a direction substantially perpendicular to the direction of said work-holder.

In testimony whereof I affix my signature.

LE ROY E. JOLLS.